(12) United States Patent
Lin et al.

(10) Patent No.: US 10,281,708 B2
(45) Date of Patent: May 7, 2019

(54) MICROSCOPE MODULE AND MICROSCOPE DEVICE

(71) Applicant: Aidmics Biotechnology Co., Ltd., Taipei (TW)

(72) Inventors: Cheng-Ming Lin, Taipei (TW); Chang-Yu Chen, Taipei (TW); Shu-Sheng Lin, Taipei (TW); Tsun-Chao Chiang, Taipei (TW)

(73) Assignee: AIDMICS BIOTECHNOLOGY CO., LTD., Taipei (TW)

( * ) Notice: Subject to any disclaimer, the term of this patent is extended or adjusted under 35 U.S.C. 154(b) by 265 days.

(21) Appl. No.: 15/235,940

(22) Filed: Aug. 12, 2016

(65) Prior Publication Data

US 2017/0045723 A1  Feb. 16, 2017

(30) Foreign Application Priority Data

Aug. 14, 2015  (TW) .............................. 104126633 A
Feb. 5, 2016  (TW) .............................. 105104127 A

(51) Int. Cl.
  *G02B 21/36*  (2006.01)
  *G02B 23/00*  (2006.01)
  (Continued)

(52) U.S. Cl.
  CPC .............. *G02B 21/362* (2013.01); *G02B 7/14* (2013.01); *G02B 21/0008* (2013.01);
  (Continued)

(58) Field of Classification Search
  CPC .... G02B 21/365; G02B 21/06; G02B 21/361; G02B 21/16; G01N 21/253; G01N 2021/6463; G01N 2021/6484
  (Continued)

(56) References Cited

U.S. PATENT DOCUMENTS 5,062,697 A  11/1991  Mitchell
2010/0091364 A1  4/2010  Wozniak
(Continued)

FOREIGN PATENT DOCUMENTS

CN  104781713 A  7/2015
JP  S5751911 U  3/1982
(Continued)

*Primary Examiner* — William R Alexander
*Assistant Examiner* — Tamara Y. Washington
(74) *Attorney, Agent, or Firm* — Muncy, Geissler, Olds & Lowe, P.C.

(57) ABSTRACT

A microscope module, which is cooperated with an image capturing module, includes a housing, a convex lens and an illumination assembly. The housing has a sample inspecting surface located on one side of the housing, which is opposite to the image capturing module. The convex lens is disposed in the housing, and the shortest distance between the sample inspecting surface and the convex lens ranges from 0.1 mm to 3.0 mm. The illumination assembly has a light source and is located between the image capturing module and the convex lens. The light emitted from the light source enters the convex lens through an input surface of the convex lens, leaves the convex lens through an output surface of the convex lens, and then reaches the sample inspecting surface. A microscope device containing the microscope module is also disclosed.

18 Claims, 15 Drawing Sheets

(51) Int. Cl.
  *G02B 7/14* (2006.01)
  *H04M 1/02* (2006.01)
  *G02B 21/00* (2006.01)
  *G02B 21/08* (2006.01)
  *G02B 7/02* (2006.01)

(52) U.S. Cl.
  CPC ........ *G02B 21/084* (2013.01); *H04M 1/0264* (2013.01); *G02B 7/022* (2013.01)

(58) Field of Classification Search
  USPC .......................................... 359/363, 350–361
  See application file for complete search history.

(56) References Cited

U.S. PATENT DOCUMENTS

| | | | |
|---|---|---|---|
| 2011/0075151 A1* | 3/2011 | Jeong | G01N 21/956 356/453 |
| 2013/0329309 A1 | 12/2013 | Huang | |
| 2014/0176787 A1 | 6/2014 | Sheng et al. | |
| 2018/0081157 A1* | 3/2018 | Monk | G02B 21/0008 |

FOREIGN PATENT DOCUMENTS

| | | |
|---|---|---|
| JP | 3180667 U | 12/2012 |
| JP | 2014029486 A | 2/2014 |
| JP | 2015057626 A | 3/2015 |
| TW | M441125 U1 | 11/2012 |
| WO | WO 2013/191665 A2 | 12/2013 |
| WO | WO-2013/191669 | 12/2013 |
| WO | WO 2015/022996 A1 | 2/2015 |

\* cited by examiner

US 10,281,708 B2

MICROSCOPE MODULE AND MICROSCOPE DEVICE

CROSS REFERENCE TO RELATED APPLICATIONS

This Non-provisional application claims priority under 35 U.S.C. § 119(a) on Patent Application No(s). 104126633 filed in Taiwan, Republic of China on Aug. 14, 2015, and 105104127 filed in Taiwan, Republic of China on Feb. 5, 2016, the entire contents of which are hereby incorporated by reference.

BACKGROUND OF THE INVENTION

Field of Invention

The present invention relates to a microscope module and a microscope device.

Related Art

The microscope is used for inspecting or measuring a very small sample, and can be applied to various research fields, such as the material science, fundamental biology, and biomedical science. In general, the microscopes include the transmission microscopes and reflective microscopes (also named optical microscopes). The transmission microscope is usually used to observe transparent or very thin samples. In practice, the light emitted from the light source can directly pass through the sample and then enter the microscope lenses for inspection of the bio tissue. In addition, the reflective microscope is usually used to observe opaque samples, such as metals or minerals, in the engineering or material sciences. In practice, the light source of the reflective microscope must pass through the polarizer to provide a polarized light, wherein a part of light is turned downward vertically and then projected on the surface of the sample through a lens. Afterwards, the surface of the sample reflects the light, which then passes through the object lens, polarizer, planar glass, and eyepiece in order, and enters the observer's eye. Accordingly, the observer can view the enlarged image of the surface of the sample.

As mentioned above, the reflective microscope includes the object lens, polarizer, planar glass, and eyepiece. In particular, the polarizer must be installed with a specific angle. Thus, the reflective microscope usually has a large volume. Besides, the reflective microscope has a complex structure and is hard to be carried to everywhere, so it is usually installed in the lab and operated by the professional operator. However, if the researcher can't inspect the samples until bringing the samples back the lab, many researches will be delayed, which causes the inconveniences of the operators. In other words, since the reflective microscope is usually applied to inspect the surface of the sample, it will sufficiently improve the utility if the reflective microscope is portable.

SUMMARY OF THE INVENTION

In view of the foregoing, an objective of the present invention is to provide a microscope module and a microscope device that can be portable. In this invention, the novel designs of the convex lens and the light traveling path from the illumination assembly can sufficiently reduce the volumes of the microscope module and microscope device, thereby achieving the purpose of the portable microscope module and microscope device.

To achieve the above objective, the present invention discloses a microscope module, which is cooperated with an image capturing module and includes a housing, a convex lens and an illumination assembly. The housing has a sample inspecting surface located on one side of the housing, which is opposite to the image capturing module. The convex lens is disposed in the housing, and a shortest distance between the sample inspecting surface and the convex lens ranges from 0.1 mm to 3.0 mm. The illumination assembly has a light source and is located between the image capturing module and the convex lens. A light emitted from the light source enters the convex lens through an input surface of the convex lens, leaves the convex lens through an output surface of the convex lens, and then reaches the sample inspecting surface.

To achieve the above objective, the present invention also discloses a microscope module, which is cooperated with an image capturing module and includes a sample inspecting surface, a convex lens and an illumination assembly. The sample inspecting surface is located at one side of the microscope module opposite to the image capturing module. A shortest distance between the sample inspecting surface and the convex lens ranges from 0.1 mm to 3.0 mm. The illumination assembly has a light source located between the image capturing module and the convex lens. A light emitted from the light source enters the convex lens through an input surface of the convex lens, leaves the convex lens through an output surface of the convex lens, and then reaches the sample inspecting surface.

To achieve the above objective, the present invention further discloses a microscope device, which includes an image capturing module and a microscope module connected to the image capturing module. The microscope module includes a housing, a convex lens and an illumination assembly. The housing has a sample inspecting surface located on one side of the housing opposite to the image capturing module. The convex lens is disposed in the housing, and a shortest distance between the sample inspecting surface and the convex lens ranges from 0.1 mm to 3.0 mm. The illumination assembly has a light source located between the image capturing module and the convex lens. A light emitted from the light source enters the convex lens through an input surface of the convex lens, leaves the convex lens through an output surface of the convex lens, and then reaches the sample inspecting surface.

In one embodiment, the light source comprises at least one visible light source or at least one invisible light source.

In one embodiment, the illumination assembly includes a switching element, the at least one visible light source, and the at least one invisible light source. The switching element is coupled to the visible light source and the invisible light source for switching between the visible light source and the invisible light source.

In one embodiment, the convex lens has a wing portion disposed at an edge of the convex lens.

In one embodiment, the light source is disposed at one part of an edge of the convex lens.

In one embodiment, the microscope module further includes a connecting element disposed on the housing for connecting to the image capturing module.

In one embodiment, the connecting element includes an adhesive layer, a connecting clip, or a hinge.

In one embodiment, the connecting element includes a cover connecting to the image capturing module.

In one embodiment, the connecting element includes a screw or a locking unit for connecting to the image capturing module by screwing or locking.

In one embodiment, the microscope module further includes a backlight unit disposed at one side of the housing away from the image capturing module.

In one embodiment, the backlight unit has a sample accommodating portion located at one side of the backlight unit close to the sample inspecting surface.

In one embodiment, the microscope module further includes a transparent substrate disposed at one side of the housing away from the image capturing module, and the sample inspecting surface is located on an external surface of the transparent substrate.

In one embodiment, the microscope module further includes an adhesive element disposed on one side of the housing configured with the sample inspecting surface.

In one embodiment, the housing has a light output hole close to the sample inspecting surface, and a ratio of an aperture of the light output hole to a diameter of the convex lens ranges between 1 and 1.5.

In one embodiment, the microscope device further includes a wireless communication module for transmitting an image retrieved by the image capturing module to an external device.

In one embodiment, the microscope device further includes an electronic connecting line for connecting the microscope module to the image capturing module.

In one embodiment, the microscope device further includes a circuit board having a control chip.

In one embodiment, the microscope device further includes an adhesive element disposed on one side of the housing configured with the sample inspecting surface.

As mentioned above, the microscope module and device of the invention have novel designs of the convex lens and the light traveling path from the illumination assembly. In detailed, the light source of the illumination assembly is disposed between the image capturing module and the convex lens, so that the light emitted from the light source enters the convex lens through an input surface of the convex lens, leaves the convex lens through an output surface of the convex lens, and then reaches the sample inspecting surface, thereby providing the light for inspecting the sample so as to execute the microscope function. In addition, since the light source of the illumination assembly is disposed between the image capturing module and the convex lens, the volumes of the microscope module and microscope device can be sufficiently reduced, thereby achieving the purpose of the portable microscope module and microscope device.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
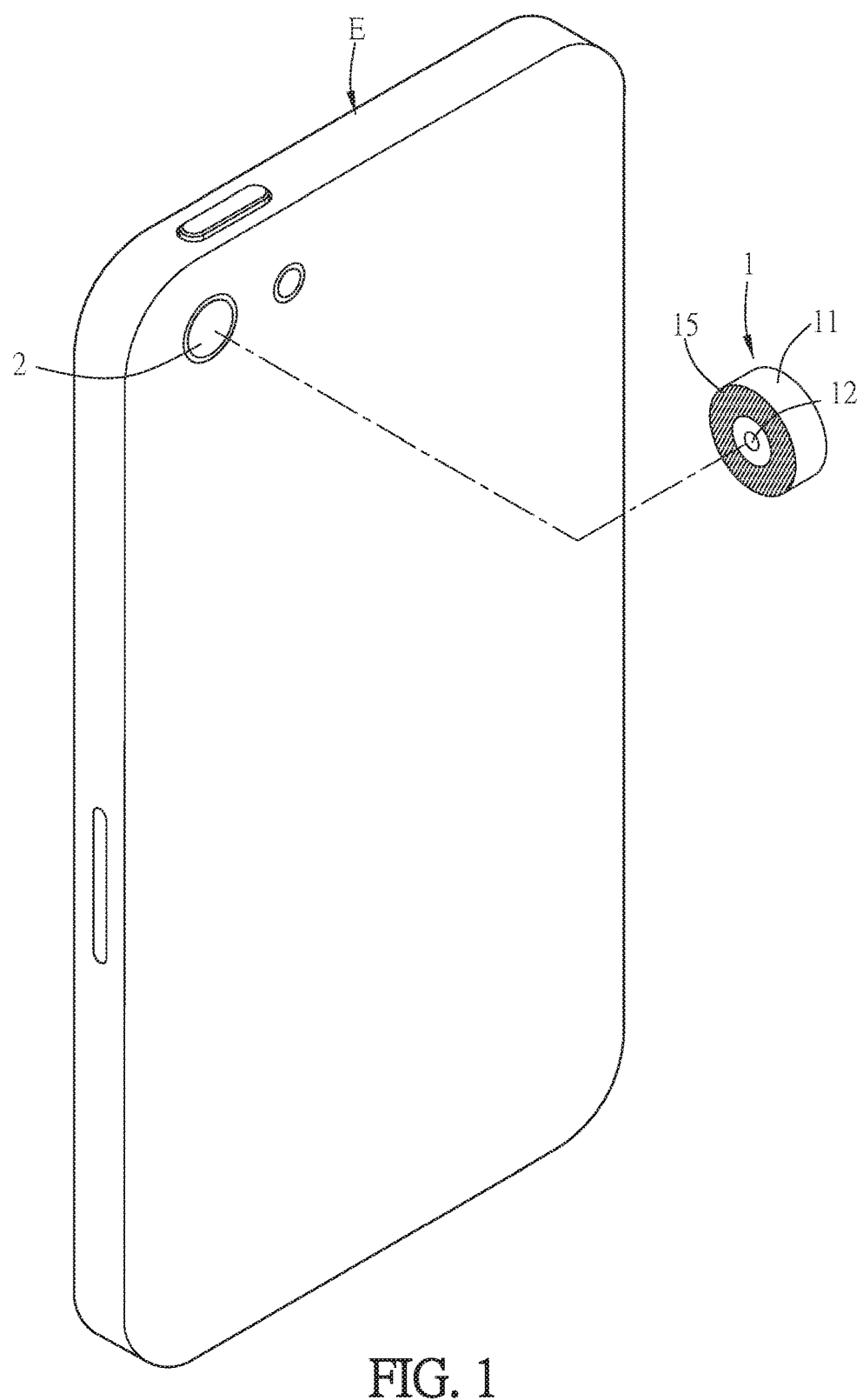
FIG. 1 is a schematic diagram showing the combination of an image capturing module and a microscope module according to an embodiment of the invention.
Figure 2:
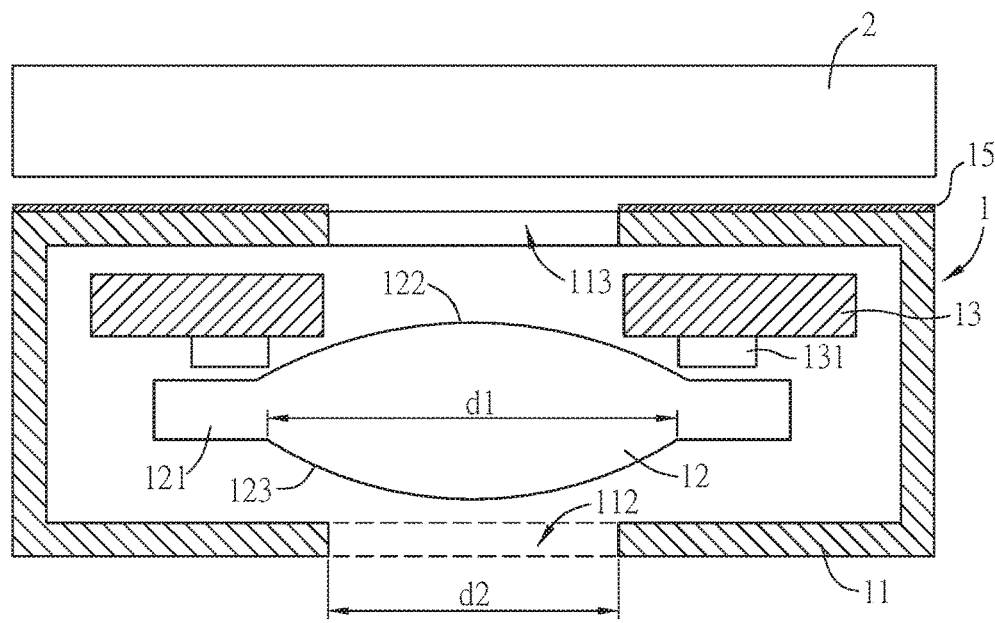
FIG. 2 is a sectional view of the microscope module of FIG. 1.

FIG. 1 is a schematic diagram showing the combination of an image capturing module and a microscope module according to an embodiment of the invention, and FIG. 2 is a sectional view of the microscope module of FIG. 1 with showing the relative position of the image capturing module 2. Referring to FIGS. 1 and 2, the microscope module 1 includes a housing 11, a convex lens 12 and an illumination assembly 13. As shown in FIG. 1, the microscope module 1 is cooperated with an image capturing module 2, and the image capturing module 2 can be installed in an electronic device E, such as a mobile communication device, a smart phone, a tablet computer, a digital camera, a driving recorder, a notebook computer, a microscope or a wearable electronic device. In this embodiment, the electronic device E is a mobile communication device for example. That is, the microscope module 1 of this embodiment is directly cooperated with the image capturing module 2 of the electronic device E. In this embodiment, the convex lens 12 is disposed in the housing 11, and one side of the housing 11 is installed on the electronic device E. The installation of the housing 11 on the electronic device E will be discussed later. The other side of the housing 11 is directly placed on the sample, or the sample is placed on the housing 11. Then, the image capturing module 2 retrieves the image of the sample through the microscope module 1, thereby providing the enlarged sample image for inspection. To be noted, the image capturing module 2 is shown as a block in FIG. 2. The sample to be inspected in this embodiment can be, for example but not limited to, leather, jewelry, jade, biological sample, or skin.

Figure 3A:
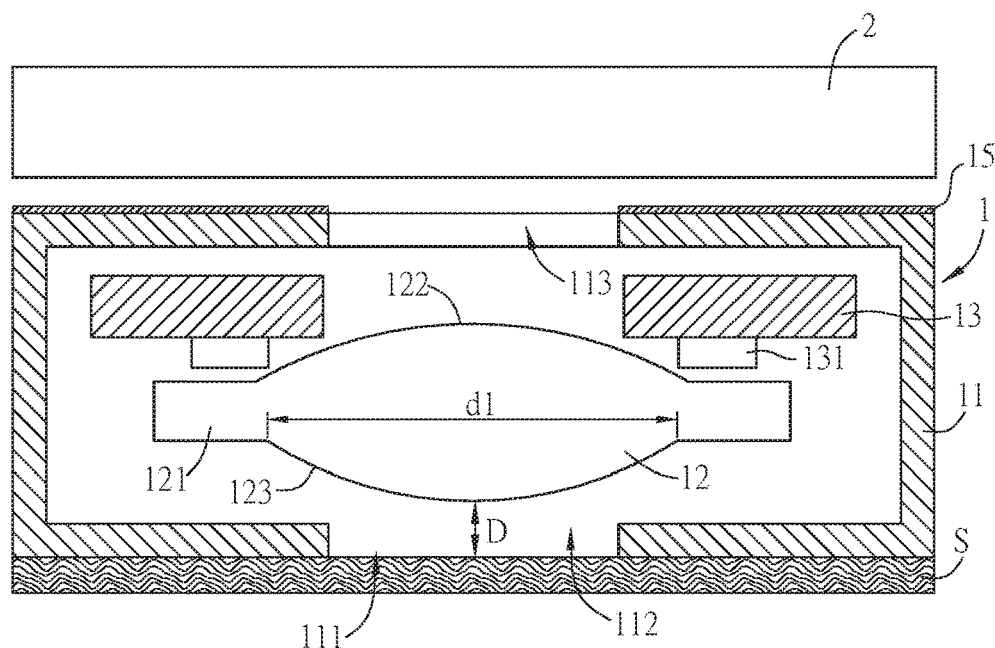
FIGS. 3A to 3D are schematic diagrams of using the microscope module of FIG. 2 to inspect a sample.
Figure 3B:
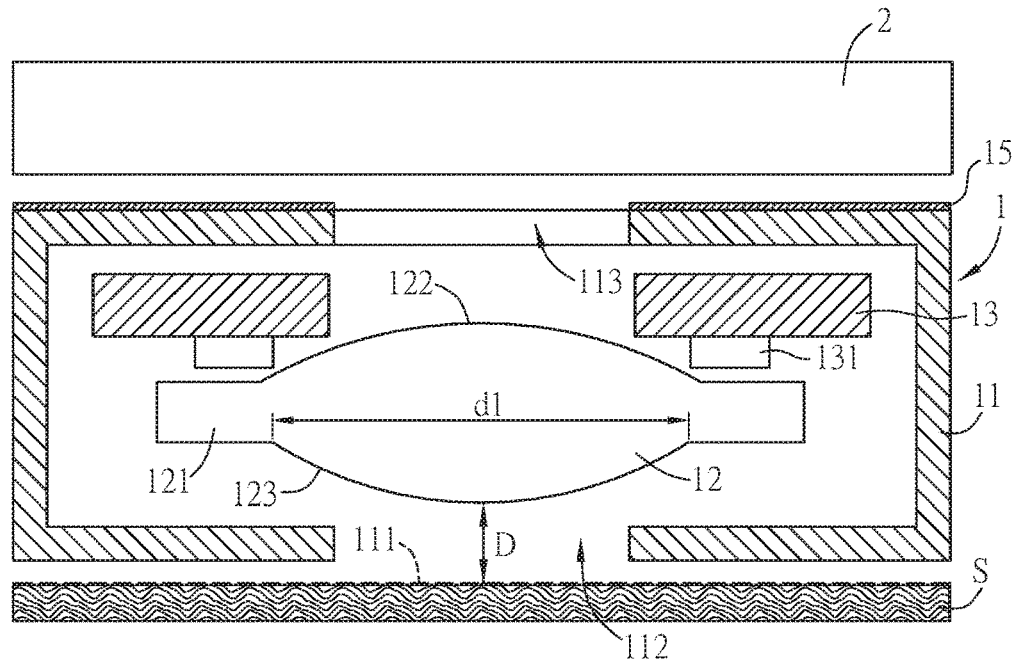
Figure 3C:
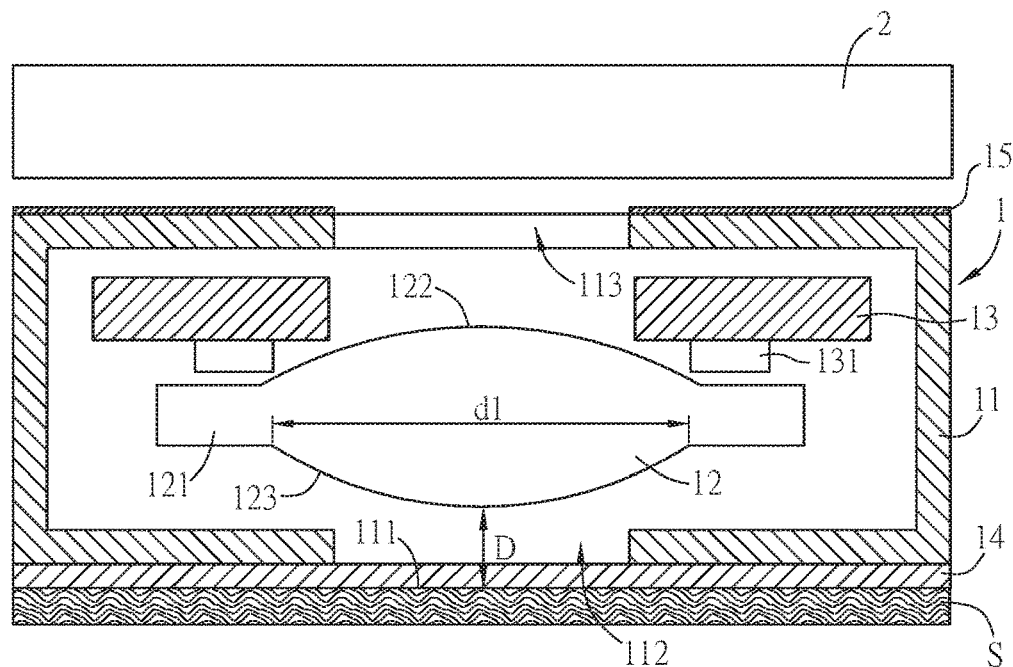

FIGS. 3A to 3C are schematic diagrams of using the microscope module 1 of FIG. 2 to inspect a sample. To be noted, the sample S in FIGS. 3A to 3C can be any object to be inspected such as the bio sample itself or the combination of the bio sample and other components (e.g. slide or sticker). For example, the sample S can be a skin sample. Otherwise, the microscope module 1 can be placed on the body for inspecting the skin of the body. Referring to FIG. 3A, the housing 11 has a sample inspecting surface 111, which is located on one side of the housing opposite to the image capturing module 2. To be noted, the sample inspecting surface 111 can be a physical surface or a virtual surface. As shown in FIG. 3A (the sample inspecting surface 111 is a physical surface), when the sample S is contacted with the housing 11, the sample inspecting surface 111 is substantially the surface of the side of the housing 11 opposite to the image capturing module 2. As shown in FIG. 3B (the sample inspecting surface 111 is a virtual surface), when the sample S and the housing 11 are departed with a little distance, the sample inspecting surface 111 is the surface of the sample S close to the microscope module 1. In one embodiment, as shown in FIG. 3C, the microscope module 1 further includes a transparent substrate 14 disposed at one side of the housing 11 away from the image capturing module 2. In this case, the sample inspecting surface 111 is located on the external surface of the transparent substrate 14.

Figure 3D:
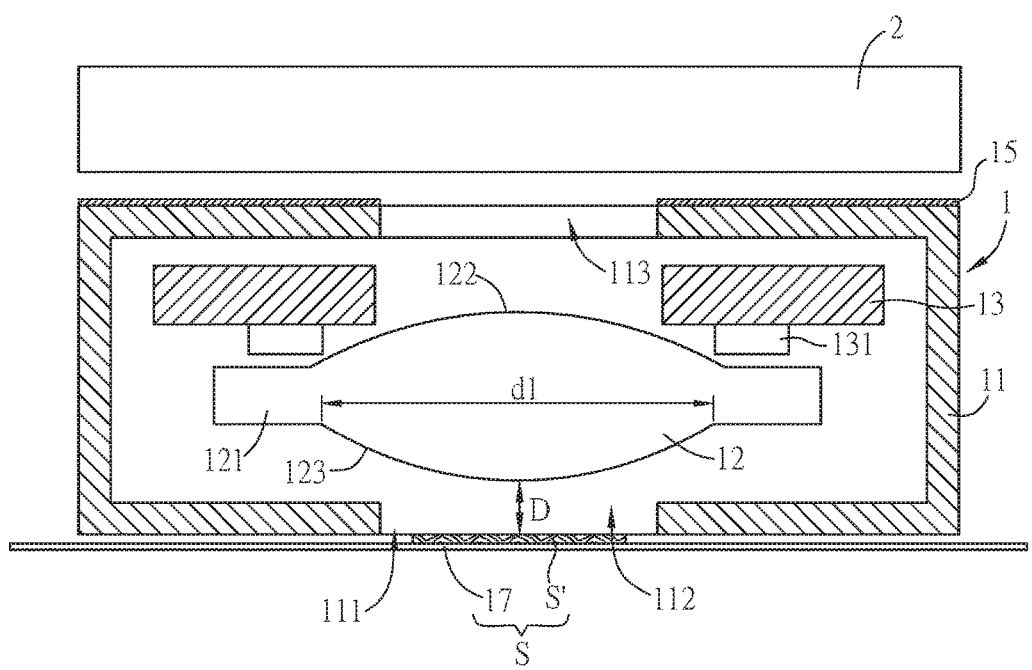

FIG. 3D is a schematic diagram of using the microscope module 1 of FIG. 2 to inspect a sample. In more detailed, the microscope module 1 further includes an adhesive element 17, and the sample S is prepared by using the adhesive element 17 to contact the bio sample S'. The adhesive element 17 can be a sticker having an adhesive surface. The adhesive element 17 has an adhesive area 171 and a non-adhesive area 172. The adhesive area 171 is configured to catch the bio sample S' and then attach to the transparent substrate 14. Since the transparent substrate 14 is usually the slide commonly used in the lab, the size of the adhesive element 17 is preferably smaller than the normal slide. For example, the diameter of the adhesive area 171 is smaller than or equal to 2.5 cm. The non-adhesive area 172 is configured to be held by the user. In one embodiment, an easy tearing line L is formed between the adhesive area 171 and the non-adhesive area 172. When the user wants to seal the bio sample S', the user can easily detach the non-adhesive area 172 from the adhesive area 171 so that the part of the adhesive element 17 protruding from the transparent substrate 14 can be removed. This design can help to easily preserve the sample S. The adhesive element 17 is disposed at one side of the housing opposite to the sample inspecting surface 111. Besides, the adhesive element 17 can be made of opaque materials for improving the contrast of the image, so that the user can observe the dark field effect under the microscope module 1. But, this invention is not limited thereto. In some embodiments, the adhesive element 17 may be made of a light-permeable material. For example, the transmittance of the adhesive element 17 is larger than 90%. In this case, the adhesive element 17 can be located at the same side as the sample inspecting surface 111 (not shown).

Figure 3E:
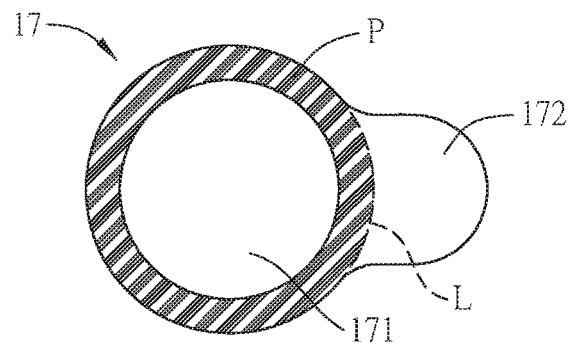
FIGS. 3E to 3G are top views of the adhesive element.
Figure 3F:
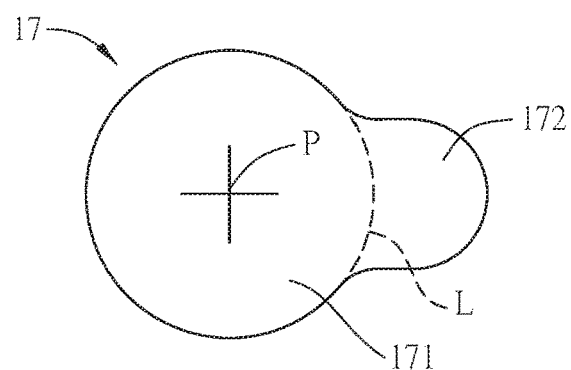
Figure 3G:
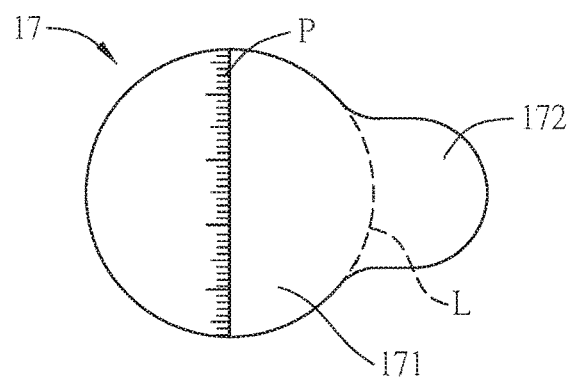

FIGS. 3E to 3G are top views of the adhesive element 17. The adhesive element 17 has a pattern P located in area corresponding to the adhesive area 171 (on the adhesive surface or the non-adhesive surface) for facilitating the following inspection. In practice, the user has to move the sample S to position the bio sample S' within the inspection field of the microscope module 1. However, when the user uses the microscope module 1 to inspect the bio sample S', it is hard to distinct the relative positions of the bio sample S' and the inspection field. In this case, the configuration of the pattern P can assist the user to rapidly recognize the relative positions of the bio sample S' and the inspection field. For example, as shown in FIG. 3E, the pattern P is an annular pattern disposed at the edge of the adhesive area 171. When the user views the pattern P within the inspection field, he or she can easily realize that the inspection field is located on the edge of the adhesive area 171 and then properly move the sample S for the following inspection. As shown in FIG. 3F, the pattern P is a cross pattern located at the center of the adhesive area 171. When the user views the pattern P within the inspection field, he or she can easily realize that the inspection field aims to the center of the adhesive area 171. In addition, it is desired to inspect the real size of the bio sample S' by the observation through the microscope module 1. Accordingly, as shown in FIG. 3G the pattern P includes a scale so that the user can directly measure the size of the bio sample S' under the inspection field.

The convex lens 12 of this embodiment is an aspherical lenticular lens. A shortest distance D between the sample inspecting surface 111 and the surface of the convex lens 12 ranges from 0.1 mm to 3.0 mm, preferably from 0.3 mm to 2.0 mm, and more preferably from 0.5 mm to 1.2 mm. Accordingly, the magnification of the microscope module 1 is between 100× and 200×. In this embodiment, the convex lens 12 has a wing portion 121 disposed at an edge of the convex lens 12. In more detailed, the center portion of the convex lens 12 has the structure of an aspherical lenticular lens, and the edge of the convex lens 12 has the structure of flat wing portion 121.

The illumination assembly 13 includes a light source 131 such as the LED, LD or fluorescent lamp. In this embodiment, the light source 131 is located between the image capturing module 2 and the convex lens 12. In more specific, the light source 131 is disposed inside the housing 11 and is located at one side of the convex lens 12 close to the image capturing module 2. According to the above configuration, the light emitted from the light source 131 enters the convex lens 12 through an input surface 122 of the convex lens 12, leaves the convex lens 12 through an output surface 123 of the convex lens 12, and then reaches the sample inspecting surface 111. The housing 11 includes a light output hole 112 and an opening 113. The light output hole 112 is disposed on one side of the housing 11 close to the sample inspecting surface 111, and the opening 113 is located on another side of the housing 11 close to the image capturing module 2. In practice, the light emitted from the light source 131 enters the convex lens 12 through an input surface 122 of the convex lens 12, leaves the convex lens 12 through an output surface 123 of the convex lens 12, passes through the light output hole 112, and then reaches the sample inspecting surface 111. After reflected from the sample inspecting surface 111, the light enters the convex lens 12 through the light output surface 123 of the convex lens 12, leaves the convex lens 12 through the input surface 122 of the convex lens 12, passes through the opening 113, and then reaches the lens of the image capturing module 2. Afterwards, the image capturing module 2 captures the enlarged sample image, and then the electronic device E can perform an image treatment process so as to display the sample image through the displaying unit of the electronic device E. Finally, the user can directly observe the enlarged sample image on the electronic device E.

As shown in FIG. 2, the convex lens 12 has a diameter d1. In this embodiment, the aspherical lenticular portion of the convex lens 12 has a diameter d1. That is, the diameter d1 does not cover the wing portion 121. The light output hole 112 has an aperture d2, and a ratio of the aperture d2 to the diameter d1 ranges between 1 and 1.5. This configuration can block the environmental light from entering the convex lens 12, thereby preventing the undesired interference to the sample image caused by the environmental light.

Preferably, the light source 131 is disposed inside the housing 11, and the position of the light source 131 is close to the wing portion 121 of the convex lens 12. The wing portion 121 is nothing to do with the captured image, so the length of wing portion 121 is not limited. The wing portion 121 is disposed around the center of the convex lens 12, so the light source 131 is disposed around the center convex portion of the convex lens 12. Accordingly, the light emitted from the light source 131 can enter the convex lens 12 from the wing portion 121, travel in the convex lens 12, and be outputted through the light output surface 123 of the convex lens 12 to focus at the focus point. The light axis of the light source 131 is different from the light axis of the convex lens 12, and they can be substantially parallel to each other.

Figure 4A:
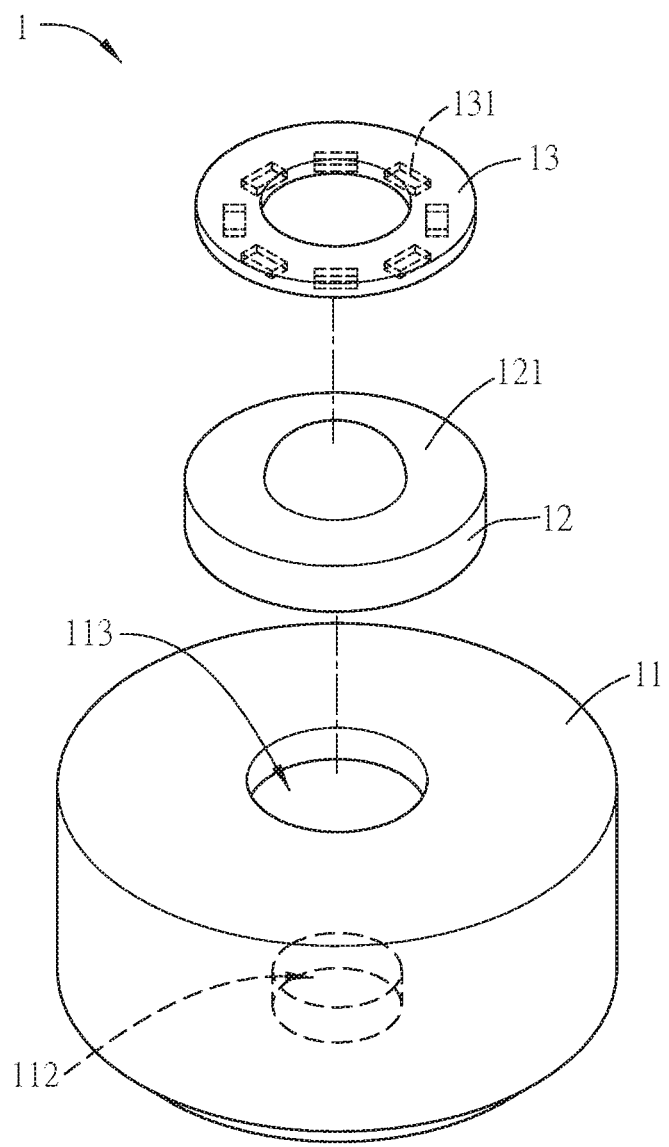
FIG. 4A is an exploded view of the microscope module of FIG. 2.
Figure 4B:
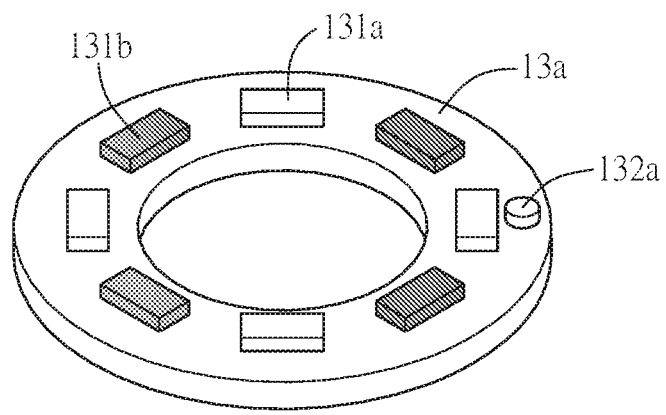
FIG. 4B is a schematic diagram showing an aspect of the illumination assembly of FIG. 4A.

In this embodiment, the light source 131 can be a visible light source or an invisible light source. The visible light source is suitable for inspecting most samples, and the invisible light source can be used for specific inspection. For example, the infrared light source can be used for inspecting jewelries, and the ultraviolet light source can be used for inspecting counterfeit labels (e.g. paper money counterfeit). In addition, the number of the light sources 131 is not limited in this invention. FIG. 4A is an exploded view of the microscope module of FIG. 2, and FIG. 4B is a schematic diagram showing an aspect of the illumination assembly of FIG. 4A. In one embodiment, the illumination assembly 13a includes a switching element 132a and a visible light source 131a or an invisible light source 131b. The switching element 132a is coupled to the visible light source 131a and the invisible light source 131b for switching between the visible light source 131a and the invisible light source 131b. When operating the microscope module 1 with the illumination assembly 13a, the user can optionally select the visible light source 131a or the invisible light source 131b depending on the sample to be inspected.

Figure 4C:
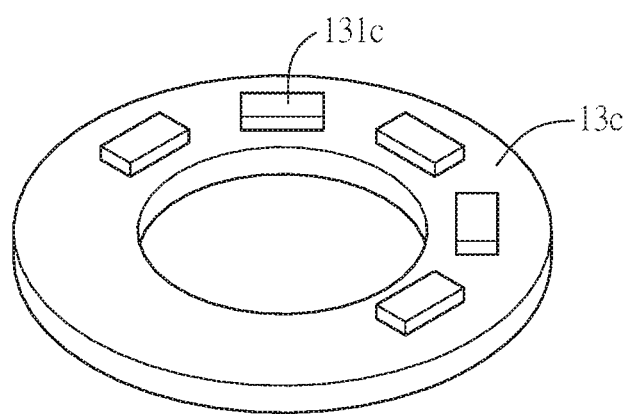
FIG. 4C is a schematic diagram showing another aspect of the illumination assembly of FIG. 4A.

FIG. 4C is a schematic diagram showing another aspect of the illumination assembly of FIG. 4A. Referring to FIGS. 4A and 4C, the light sources 131c of the illumination assembly 13c are all disposed at one side of the convex lens 12. In other embodiments, the switching element 132a of FIG. 4B is also configured for controlling the ON/OFF of the light sources 131c. This one side configuration of the light sources 131c can generate the shadow when irradiating the sample, thereby improving the resolution.

As shown in FIGS. 1 and 2, the microscope module 1 may further include a connecting element 15 disposed on the housing 11 for connecting to the image capturing module 2. In more specific, the connecting element 15 is an adhesive layer, and preferably a pressure sensitive adhesive, which is sensitive to pressure and is reusable. The microscope module 1 is attached to the electronic device E by the connecting element 15 (adhesive layer), and the opening 113 is aligned to the lens of the image capturing module 2. Thus, the microscope module 1 and the image capturing module 2 are assemble for following operation.

Figure 5A:
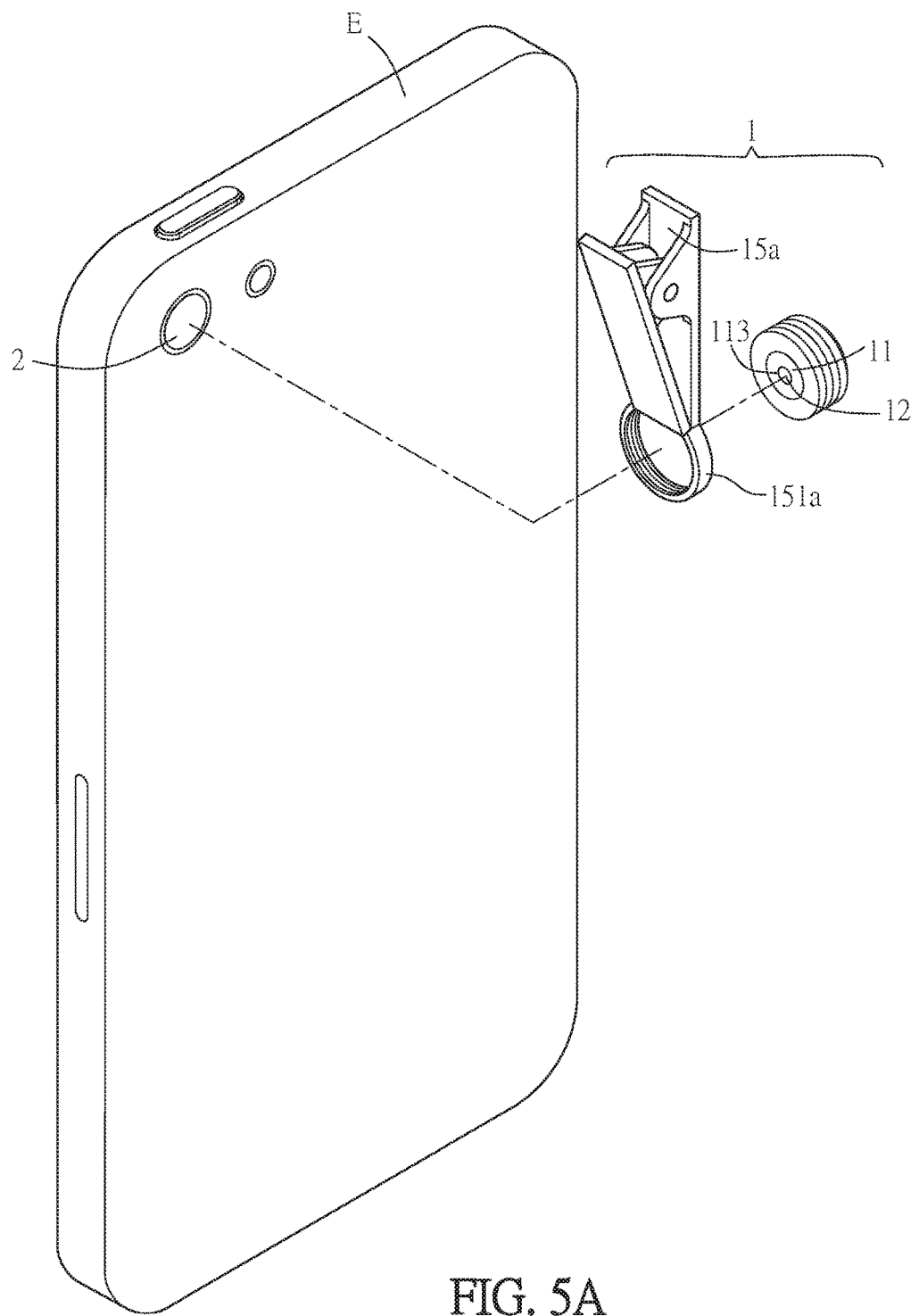
FIG. 5A is a schematic diagram showing an aspect of the connecting element of FIG. 2.

FIG. 5A is a schematic diagram showing an aspect of the connecting element of FIG. 2. As shown in FIG. 5A, the connecting element 15a is a connecting clip for directly clipping the microscope module 1 to the electronic device E, and the opening 113 is also aligned to the lens of the image capturing module 2. In more detailed, the connecting element 15a (connecting clip) has a clipping end 151a, which has a screw thread matching to that of the housing 11 of the microscope module 1. Thus, the microscope module 1 can be assembled with the connecting element 15a in advance. Afterwards, the connecting element 15a along with the microscope module 1 is clipped to the electronic device E, and the opening 113 is aligned to the lens of the image capturing module 2. Accordingly, the light can be reflected from the sample, pass through the light output hole 112, the convex lens 12 and the opening 113, and then reach the image capturing module 2 (referring to FIG. 2).

Figure 5B:
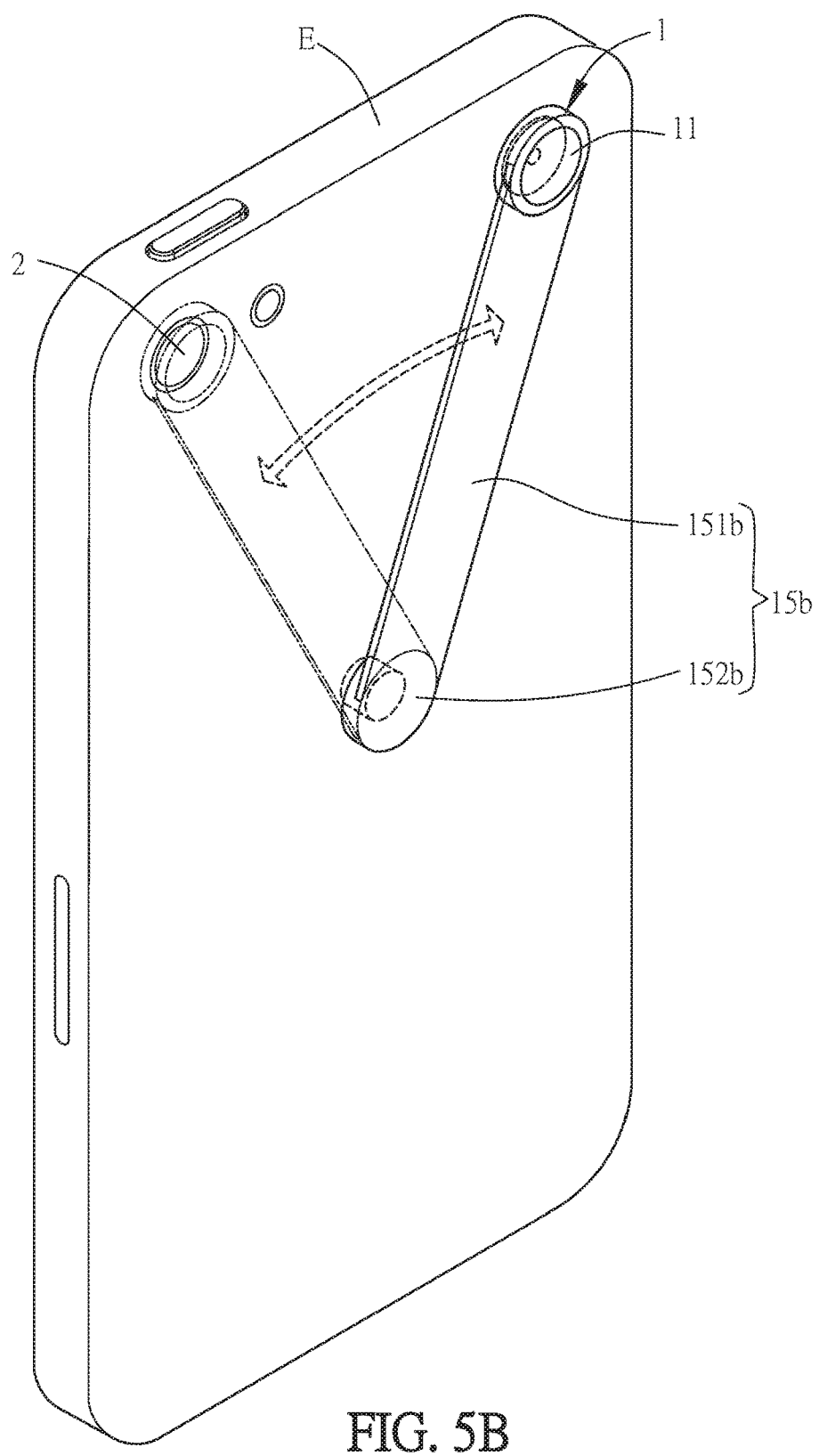
FIG. 5B is a schematic diagram showing another aspect of the connecting element of FIG. 2.

FIG. 5B is a schematic diagram showing another aspect of the connecting element of FIG. 2. As shown in FIG. 5B, the connecting element 15b is a hinge. In more detailed, the connecting element 15b includes an axial portion 151b and a pivotal portion 152b. One end of the axial portion 151b is fixed on the housing 11 of the microscope module 1. For example, the axial portion 151b can be directly adhered to the housing 11, or connected by screwing or locking. This invention is not limited. The other end of the axial portion 151b is connect to the pivotal portion 152b, which is disposed on the housing of the electronic device E, so that the microscope module 1 and the image capturing module 2 can be connected by the connecting element 15b. The user can move the axial portion 151b to slide the microscope module 1 on the housing of the electronic device E about the pivotal portion 152b. Since the connecting element 15b is a hinge structure, the microscope module 1 can be generally installed on the housing of the electronic device E. When the user needs the microscope function, he or she can pull the axial portion 151b to align the opening 113 of the microscope module 1 with the lens of the image capturing module 2 (referring to FIG. 2).

Figure 5C:
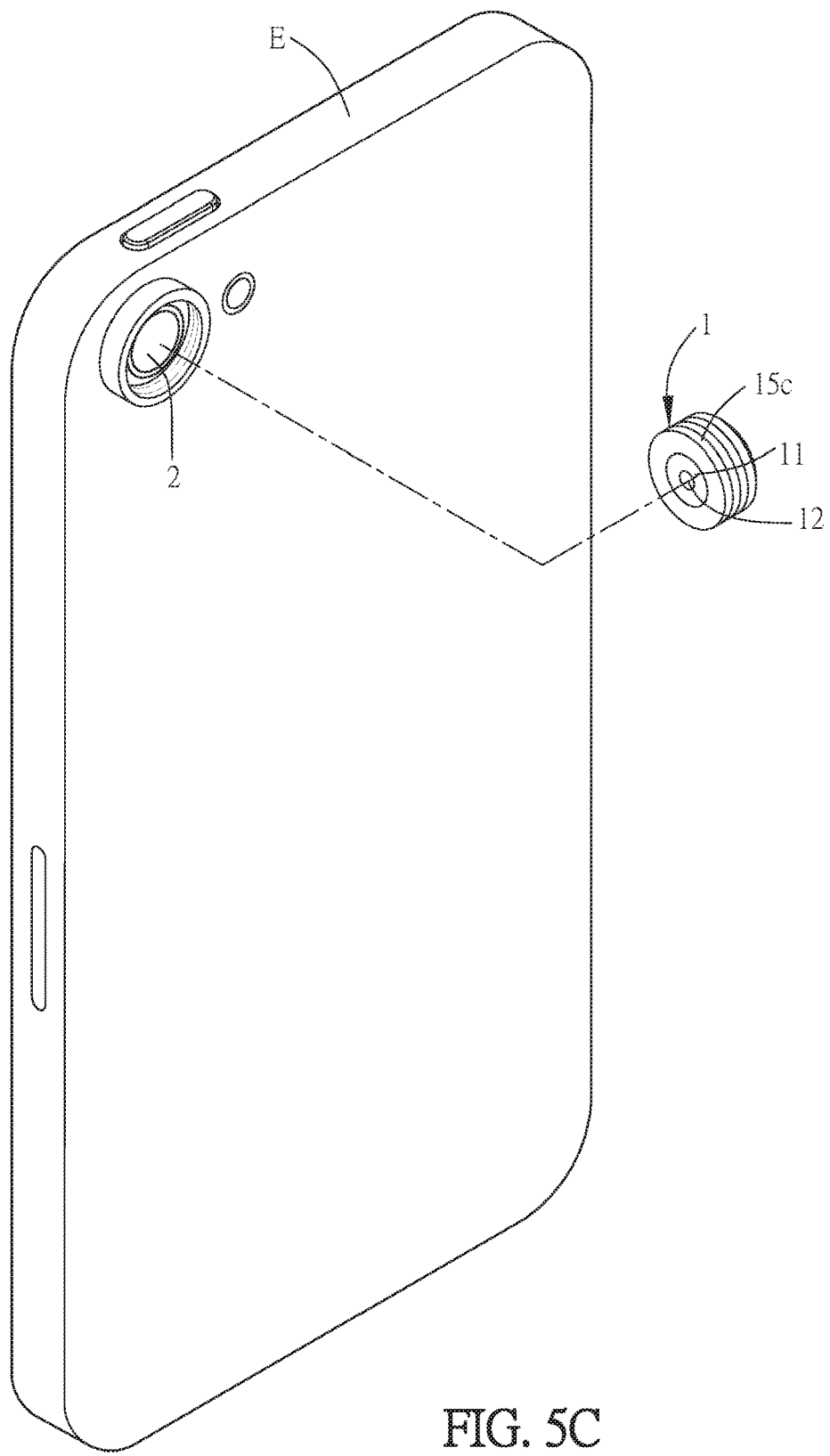
FIG. 5C is a schematic diagram showing another aspect of the connecting element of FIG. 2.

FIG. 5C is a schematic diagram showing another aspect of the connecting element of FIG. 2. As shown in FIG. 5C, the connecting element 15c includes a screw or a locking unit for connecting to the image capturing module 2 by screwing or locking. In this embodiment, the connecting element 15c is a screw. The housing of the electronic device E has a corresponding screw structure, so that the microscope module 1 can be directly connected to the image capturing module 2 by screwing or locking.

Figure 5D:
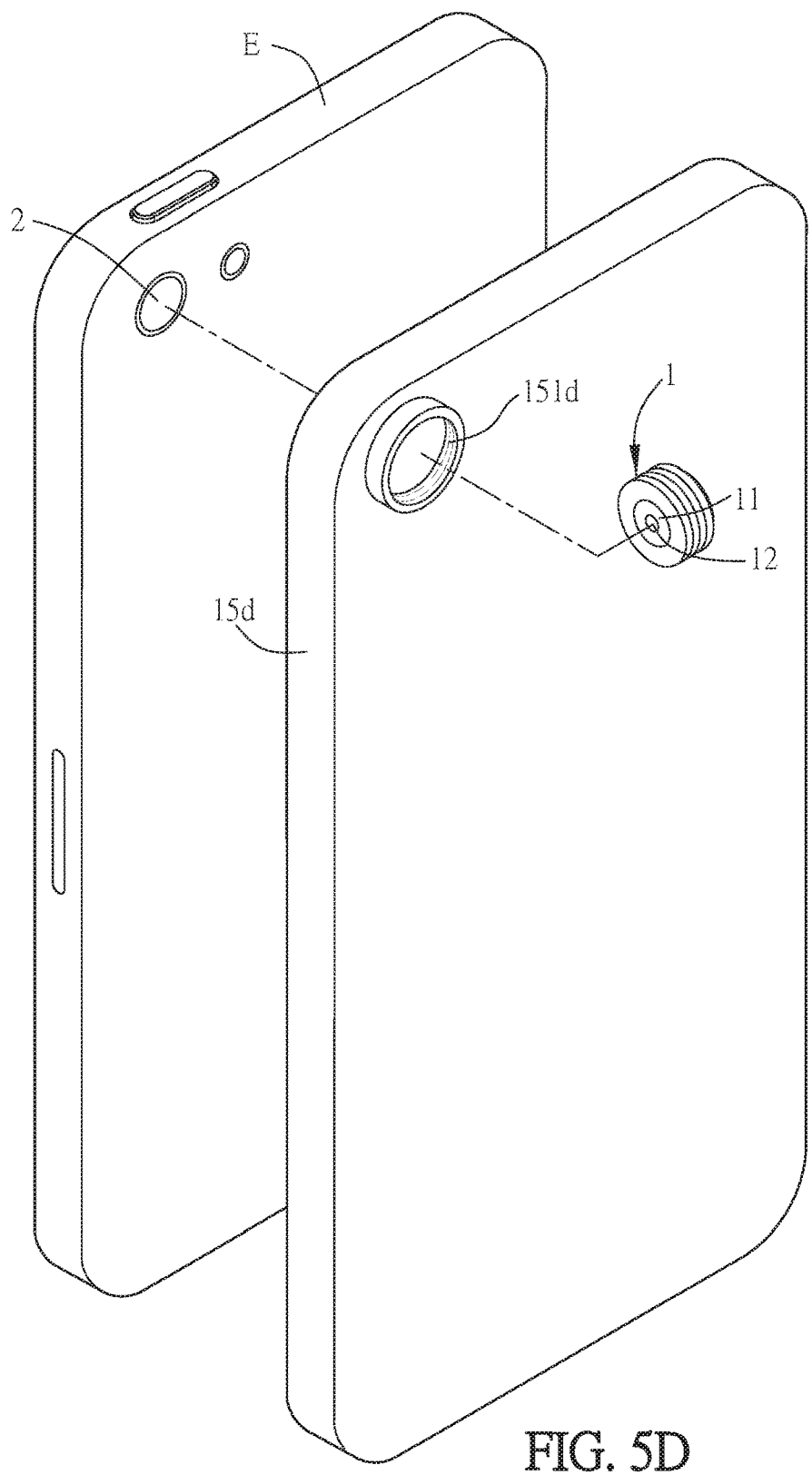
FIG. 5D is a schematic diagram showing another aspect of the connecting element of FIG. 2.

FIG. 5D is a schematic diagram showing another aspect of the connecting element of FIG. 2. In this embodiment, the connecting element 15d is a cover, which is configured for protecting the back cap of the electronic device E. The cover has a hollow portion 151d located corresponding to the lens of the image capturing module 2. The edge of the hollow portion 151d can be configured with a screw or a locking unit for connecting to the housing of the electronic device E by screwing or locking. In practice, the user can mount the connecting element 15d (cover) on the housing of the electronic device E. When the user needs the microscope function, he or she can install the microscope module 1 to the connecting element 15d (cover) by screwing or locking.

Figure 6:
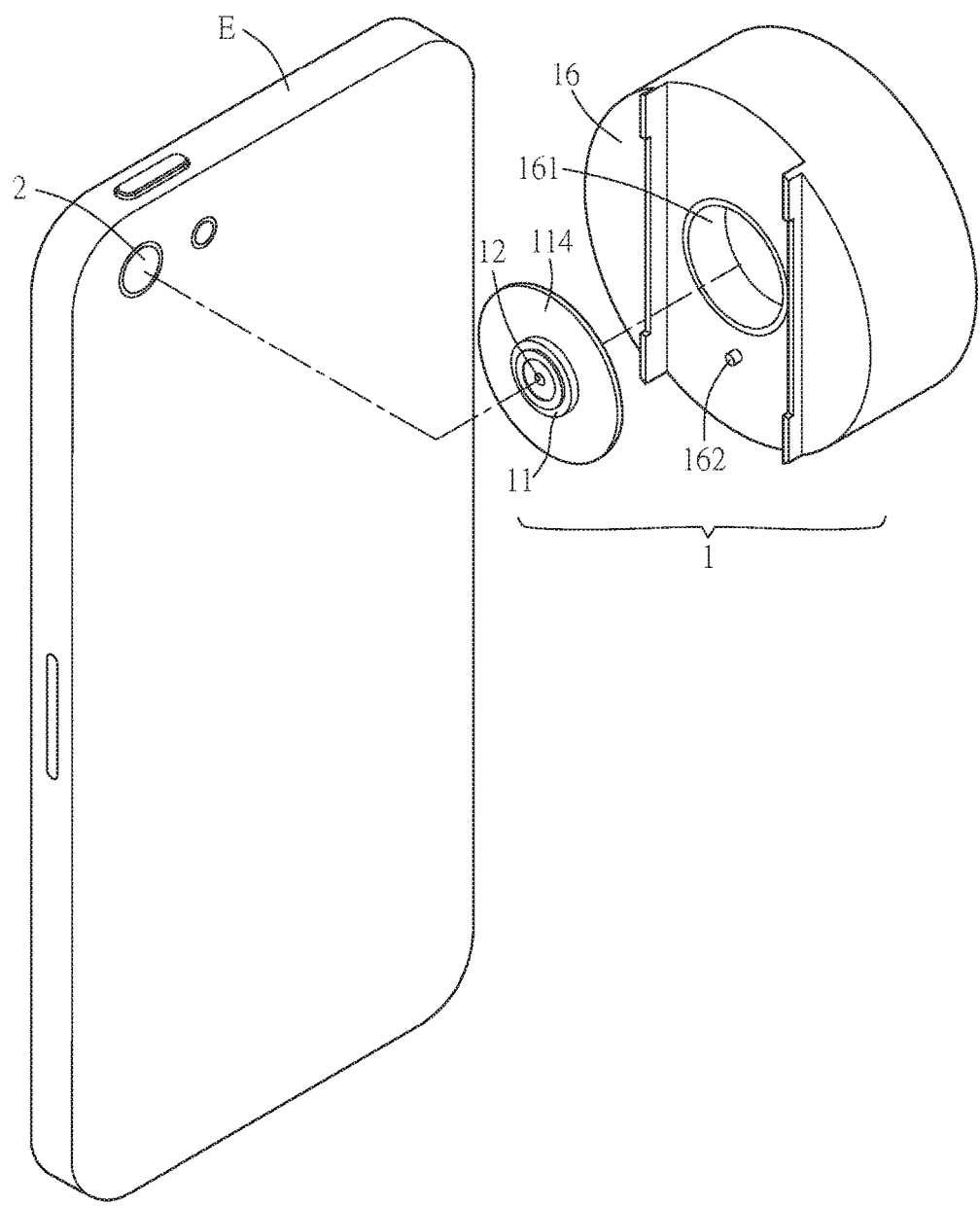
FIG. 6 is a schematic diagram showing a microscope module of the embodiment cooperated with an image capturing module.

FIG. 6 is a schematic diagram showing a microscope module of the embodiment cooperated with an image capturing module. As shown in FIG. 6, the microscope module 1 may further include a backlight unit 16 disposed at one side of the housing 11 away from the image capturing module 2, and the sample is placed between the housing 11 and the backlight unit 16. In this embodiment, the microscope module of this embodiment can be applied to the sample with higher transmittance, such as the jewelries or jades. The backlight unit 16 can emit the auxiliary light to help the inspection. The sample reflects the auxiliary light to the convex lens 12, and then the image capturing module 2 receives the reflected auxiliary light. Preferably, the backlight module 16 has a sample accommodating portion 161 located at one side of the backlight unit 16 close to the sample inspecting surface 111 (referring to FIGS. 3A to 3C) for accommodating the sample. Preferably, the external surface of the housing 11 is configured with a magnet portion 114, and the material of the backlight unit 16 can be attracted by the magnet portion 114. Thus, the housing 11 and the backlight unit 16 can be fixed to each other. The user can press the power switch 162 of the backlight unit 16 for activating the backlight unit 16.

Figure 7:
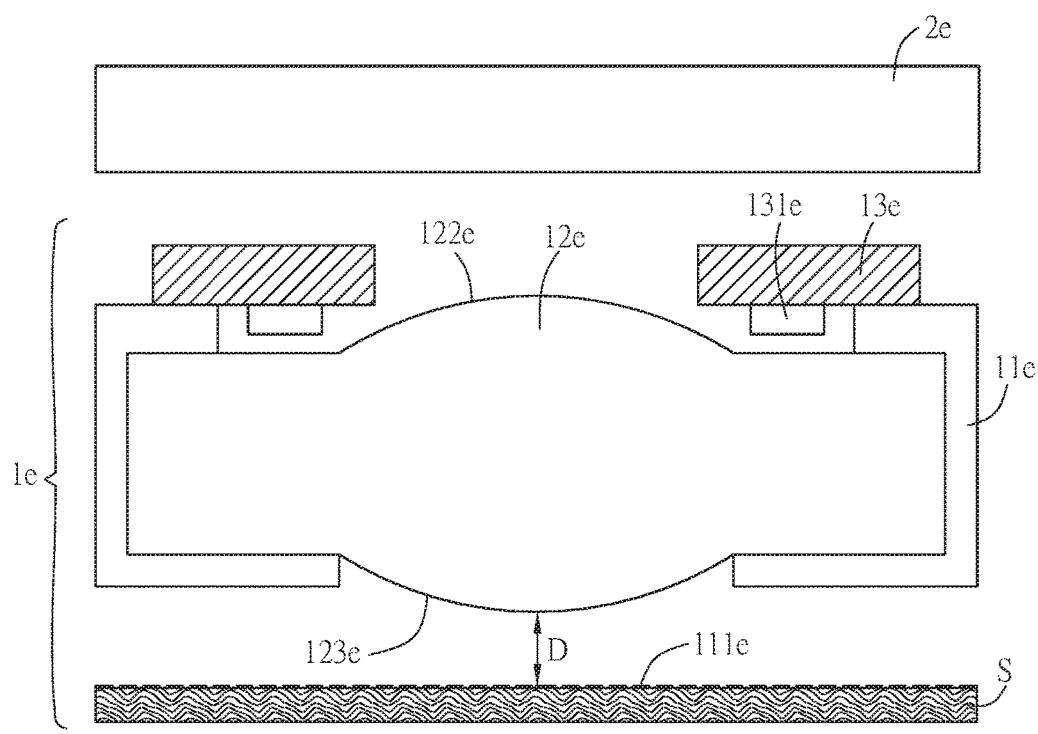
FIG. 7 is a sectional view of the microscope module of the embodiment cooperated with the image capturing module.

FIG. 7 is a sectional view of the microscope module of the embodiment cooperated with the image capturing module. Referring to FIG. 7, the microscope module 1*e* is cooperated with an image capturing module 2*e* and includes a sample inspecting surface 111*e*, a convex lens 12*e* and an illumination assembly 13*e*. Preferably, the microscope module 1*e* includes a housing 11*e*, which is made of a transparent material, and the housing 11*e* and the convex lens 12*e* are integrally formed as one piece. The sample inspecting surface 111*e* is located on one side of the microscope module 11*e* opposite to the image capturing module 2*e*. To be noted, the sample inspecting surface 111*e* can be a physical surface or a virtual surface (as the sample inspecting surface 111 of the previous embodiment). That is, the sample inspecting surface 111 can be substantially the surface of the side of the housing 11*e* opposite to the image capturing module 2*e* or the surface of the sample S close to the microscope module 1*e* (see FIG. 7). The details of the microscope module 1*e* and the sample inspecting surface 111*e* can be referred to the illustrations of FIGS. 3A to 3C, so the detailed descriptions thereof will be omitted.

A shortest distance D between the sample inspecting surface 111*e* and the convex lens 12*e* ranges from 0.6 mm to 3.0 mm. The illumination assembly 13*e* includes a light source 131*e* located between the image capturing module 2*e* and the convex lens 12*e*. The light emitted from the light source 131*e* enters the convex lens 12*e* through an input surface 122*e* of the convex lens 12*e*, leaves the convex lens 12*e* through an output surface 123*e* of the convex lens 12*e*, and then reaches the sample inspecting surface 111*e* to irradiate the sample S. The details of the relative components can be referred to the previous embodiment, so the descriptions thereof will be omitted.

Figure 8:
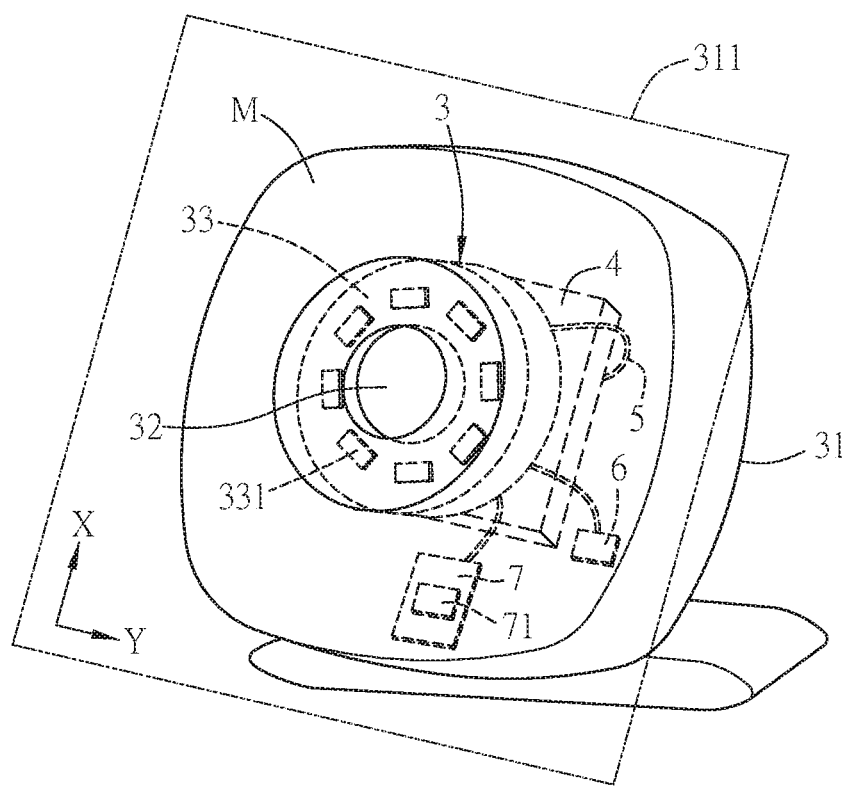
FIG. 8 is a schematic diagram showing a microscope device according to an embodiment of the invention.

The microscope module 1 and the electronic device E can be assembled, so that the image capturing module 2 of the electronic device E and the microscope module 1 can cooperate to form a microscope device and provide a microscope function. In one embodiment, the microscope module 1 is directly assembled with the image capturing module 2 to form the microscope device M. FIG. 8 is a schematic diagram showing a microscope device M according to an embodiment of the invention. As shown in FIG. 8, the microscope device M includes a microscope module 3 and an image capturing module 4, which are connected to each other. In this embodiment, the microscope device M further includes an electronic connecting line 5 for connecting the microscope module 3 to the image capturing module 4. The microscope module 3 includes a housing 31, a convex lens 32 and an illumination assembly 33. The housing 31 is also the case of the entire microscope device M, and the convex lens 32, the illumination assembly 33 and the image capturing module 4 are all disposed within the housing 31. Of course, in other embodiments, the housing 31 of the microscope module 3 can be disposed within the microscope device M, or the image capturing module 4 can be disposed outside of the housing 31. This invention is not limited.

Similarly, the housing 31 has a sample inspecting surface 311. The details of the sample inspecting surface 311 can be referred to the sample inspecting surface 111 of the previous embodiment, so the description thereof will be omitted. The shortest distance D between the sample inspecting surface 311 and the convex lens 32 ranges from 0.1 mm to 3.0 mm, preferably from 0.3 mm to 2.0 mm, and more preferably from 0.5 mm to 1.2 mm.

The illumination assembly 33 also includes a light source 331 located between the image capturing module 4 and the convex lens 32. In this embodiment, the light emitted from the light source 331 enters the convex lens 32 through an input surface of the convex lens 32, leaves the convex lens 32 through an output surface of the convex lens 32, and then reaches the sample inspecting surface 311. After reflected from the sample inspecting surface 311, the light passes through the convex lens 32 and is then received by the image capturing module 4. Preferably, the microscope device M further includes a wireless communication module 6 and a circuit board 7. The circuit board 7 includes a control chip 71. The configuration of the wireless communication module 6 allows to transmit an image retrieved by the image capturing module 4 to an external device. In more specific, the control chip 71 controls the image capturing module 4 to capture the enlarged sample image, and then performs an image treatment process. Afterwards, the enlarged sample image is transmitted to the external device (e.g. the display unit of another electronic device) through the wireless communication module 6. Accordingly, the user can observe the sample image enlarged by the microscope module 3 in another electronic device. The detailed actions of the microscope module 3 and the image capturing module 4 can be referred to the previous embodiments, so the description thereof will be omitted.

Figure 9:
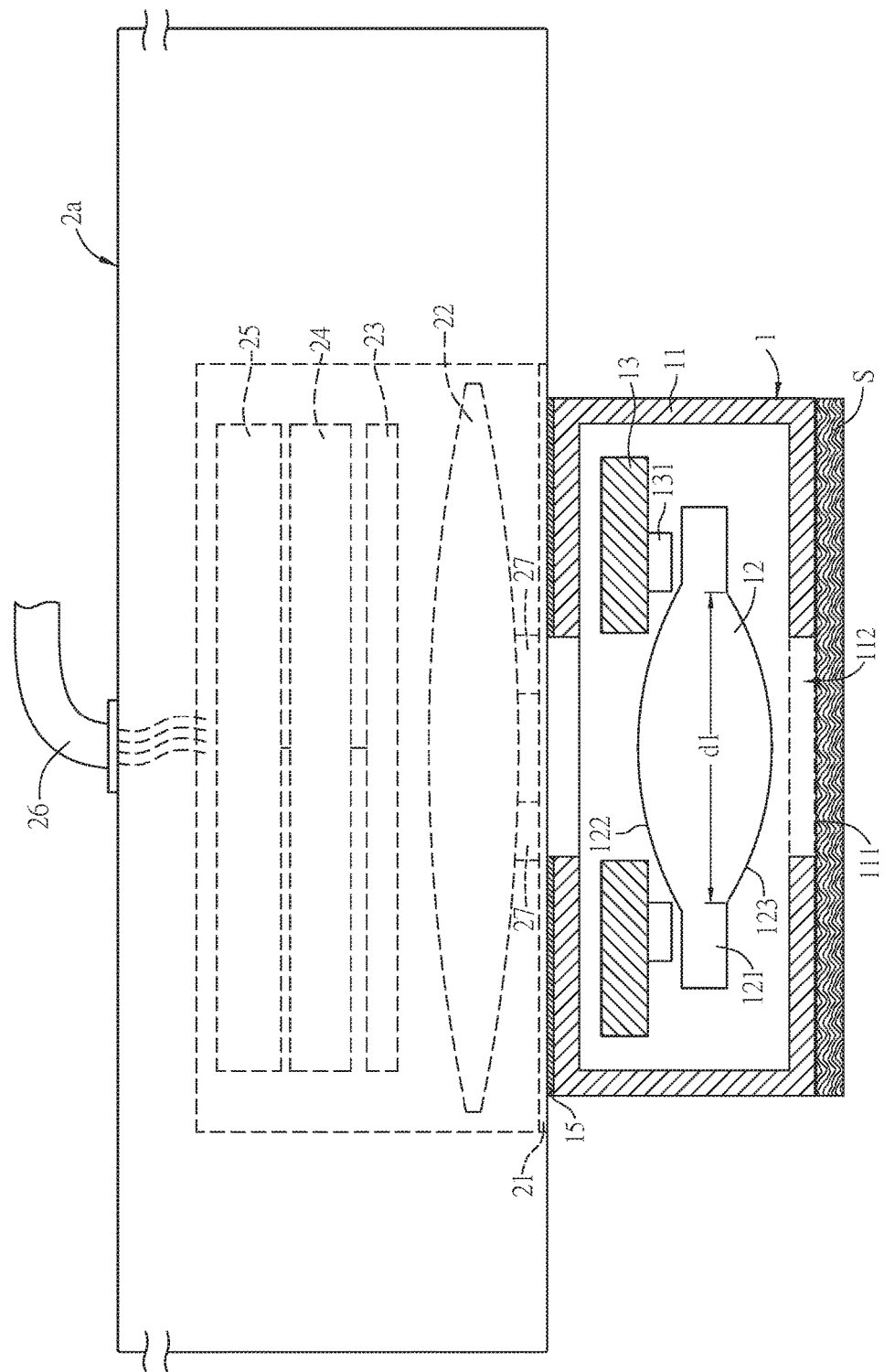
FIG. 9 is a schematic diagram showing a microscope module of another embodiment cooperated with another image capturing module.

FIG. 9 is a schematic diagram showing a microscope module of another embodiment cooperated with another image capturing module. Referring to FIG. 2, the microscope module 1 includes a housing 11, a convex lens 12 and an illumination assembly 13. Referring to FIG. 9, the image capturing module 2*a* includes a glass 21, a convex lens 22, a light sensing element 23, an A/D convertor 24, a processing unit 25, connecting line 26, and a light emitting source 27. The glass 21 can be a planar glass and be disposed on the inner side of the image capturing module 2*a* close to the light input surface 122 of the convex lens 12 for protecting the internal components of the image capturing module 2*a*. The convex lens 22 is disposed adjacent to the glass. Different from the convex lens 12 of the microscope module 1, the convex lens 22 does not include the peripheral flat wing portion. The light sensing element 23 can be a CMOS or a CCD for receiving the light passing through the convex lens 22 to generate the image signal. The light sensing element 23, the A/D convertor 24 and the processing unit 25 can be disposed on a printed circuit board and process the sensed image signal. The connecting line 26 is, for example, a USB connecting line for transmitting the processed image signal to the electronic device E. Besides, the connecting line 26 can be covered by an extendable and flexible tube. The light source 26 can be an LED, LD, or fluorescent lamp, which is disposed at the front end of the image capturing module 2*a*.

Different from the image capturing module 2 of FIG. 2, the image capturing module 2*a* of FIG. 9 is an optical component of an endoscope. The image capturing module 2*a* can be connected to the microscope module 1 through the connecting element 15, so that the microscope module 1 can cooperate with the image capturing module 2*a*. In addition, the opening of the housing 11, which is locate at the opposite side of the light output hole 112, can be configured with a magnet element, a locking element or a screw structure. The image capturing module 2*a* has the corresponding structure, so that the microscope module 1 and the image capturing module 2*a* can be assembled by magnetic attracting, locking or screwing. Besides, the image capturing module 2*a* may have a protruding portion corresponding to the shape and size of the opening, so that the microscope module 1 and the image capturing module 2a can be assembled by inserting the protruding portion into the opening. In this embodiment, the microscope module 1 and the image capturing module 2a are assembled by the connecting element 15 of the housing 11. In more specific, the connecting element 15 is an adhesive layer, and preferably a pressure sensitive adhesive, which is sensitive to pressure and is reusable. The microscope module 1 is attached to the image capturing module 2a by the connecting element 15 (adhesive layer), and the convex lens 12 of the microscope module 1 is aligned to the convex lens 22 of the image capturing module 2a. Thus, the microscope module 1 and the image capturing module 2a are assemble for following operation. After assembling the microscope module 1 and the image capturing module 2a, the light emitting source 27 can also emit light to increase the brightness of the sample S.

The housing 11 also has a light output hole 112. Accordingly, the light emitted from the light emitting source 27 enters the convex lens 12 through an input surface 122 of the convex lens 12, leaves the convex lens 12 through an output surface 123 of the convex lens 12, passes through the light output hole 112, and then reaches the sample inspecting surface 111. After reflected from the sample inspecting surface 111, the light enters the convex lens 12 through the light output surface 123 of the convex lens 12, leaves the convex lens 12 through the input surface 122 of the convex lens 12, passes through the opening 113, and then reaches the light sensing element 23. The light sensing element 23 can capture the light entering the image capturing module 2a through the convex lens 22 so as to generate the image signal. Then, the A/D convertor 24 converts the image signal into an electronic signal. Afterwards, the processing unit 25 performs an image treatment process so as to obtain an enlarged image, which is transmitted to the electronic device E through the connecting line 26. Thus, the displaying unit of the electronic device E can display the enlarged sample image. Accordingly, the user can select the general endoscope to cooperate with the microscope module 1 of this invention for inspecting the enlarged sample image.

In summary, the microscope module and device of the invention have novel designs of the convex lens and the light traveling path from the illumination assembly. In detailed, the light source of the illumination assembly is disposed between the image capturing module and the convex lens, so that the light emitted from the light source enters the convex lens through an input surface of the convex lens, leaves the convex lens through an output surface of the convex lens, and then reaches the sample inspecting surface, thereby providing the light for inspecting the sample so as to execute the microscope function. In addition, since the light source of the illumination assembly is disposed between the image capturing module and the convex lens, the volumes of the microscope module and microscope device can be sufficiently reduced, thereby achieving the purpose of the portable microscope module and microscope device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A microscope module, which is cooperated with an image capturing module, comprising:
    a housing having a sample inspecting surface, wherein the sample inspecting surface is located on one side of the housing, which is opposite to the image capturing module;
    a convex lens disposed in the housing, wherein a shortest distance between the sample inspecting surface and the convex lens ranges from 0.1 mm to 3.0 mm, and the convex lens has a flat wing portion at an edge of the convex lens; and
    an illumination assembly having a light source and located between the image capturing module and the convex lens, wherein the light source is disposed at the flat wing portion, wherein a light emitted from the light source enters the flat wing portion of the convex lens through an input surface of the convex lens, leaves the flat wing portion of the convex lens through an output surface of the convex lens, and then reaches the sample inspecting surface.

2. The microscope module of claim 1, wherein the light source comprises at least one visible light source or at least one invisible light source.

3. The microscope module of claim 1, further comprising:
    a connecting element disposed on the housing for connecting to the image capturing module.

4. The microscope module of claim 1, further comprising:
    a backlight unit disposed at one side of the housing away from the image capturing module.

5. The microscope module of claim 1, further comprising:
    a transparent substrate disposed at one side of the housing away from the image capturing module, wherein the sample inspecting surface is located on an external surface of the transparent substrate.

6. The microscope module of claim 1, further comprising:
    an adhesive element disposed on one side of the housing configured with the sample inspecting surface.

7. The microscope module of claim 1, wherein the housing has a light output hole close to the sample inspecting surface, and a ratio of an aperture of the light output hole to a diameter of the convex lens ranges between 1 and 1.5.

8. The microscope module of claim 1, wherein the light source is a light emitting device disposed within the housing, wherein after the light reaches the sample inspecting surface, the light is reflected by the sample inspecting surface to a lens portion of the convex lens.

9. A microscope device, comprising:
    an image capturing module; and
    a microscope module connected to the image capturing module and comprising:
        a housing having a sample inspecting surface, wherein the sample inspecting surface is located on one side of the housing, which is opposite to the image capturing module,
        a convex lens disposed in the housing, wherein a shortest distance between the sample inspecting surface and the convex lens ranges from 0.1 mm to 3.0 mm, and the convex lens has a flat wing portion at an edge of the convex lens, and
        an illumination assembly having a light source located between the image capturing module and the convex lens, wherein the light source is disposed at the flat wing portion, wherein a light emitted from the light source enters the flat wing portion of the convex lens through an input surface of the convex lens, leaves the flat wing portion of the convex lens through an output surface of the convex lens, and then reaches the sample inspecting surface.

10. The microscope device of claim 9, wherein the light source comprises at least one visible light source or at least one invisible light source.

11. The microscope device of claim 9, wherein the microscope module further comprises a connecting element disposed on the housing for connecting to the image capturing module.

12. The microscope device of claim 9, further comprising:
a backlight unit disposed at one side of the housing away from the image capturing module.

13. The microscope device of claim 9, further comprising:
a transparent substrate disposed at one side of the housing away from the image capturing module, wherein the sample inspecting surface is located on an external surface of the transparent substrate.

14. The microscope device of claim 9, further comprising:
an adhesive element disposed on one side of the housing configured with the sample inspecting surface.

15. The microscope device of claim 9, wherein the housing has a light output hole close to the sample inspecting surface, and a ratio of an aperture of the light output hole to a diameter of the convex lens ranges between 1 and 1.5.

16. The microscope device of claim 9, further comprising:
a wireless communication module for transmitting an image retrieved by the image capturing module to an external device.

17. The microscope device of claim 9, wherein the light source is a light emitting device disposed within the housing, wherein after the light reaches the sample inspecting surface, the light is reflected by the sample inspecting surface to a lens portion of the convex lens.

18. A microscope module, which is cooperated with an image capturing module, comprising:
a housing having a sample inspecting surface, wherein the sample inspecting surface is located on one side of the housing, which is opposite to the image capturing module;
a convex lens disposed in the housing, wherein a shortest distance between the sample inspecting surface and the convex lens ranges from 0.1 mm to 3.0 mm; and
an illumination assembly having a light source and located between the image capturing module and the convex lens, wherein a light emitted from the light source enters the convex lens through an input surface of the convex lens, leaves the convex lens through an output surface of the convex lens, and then reaches the sample inspecting surface,
wherein the housing has a light output hole close to the sample inspecting surface, and a ratio of an aperture of the light output hole to a diameter of the convex lens ranges between 1 and 1.5.

* * * * *